No. 644,686. Patented Mar. 6, 1900.
E. M. RUNYAN & M. G. POND.
BICYCLE.
(Application filed Oct. 4, 1897.)
(No Model.) 4 Sheets—Sheet 1.
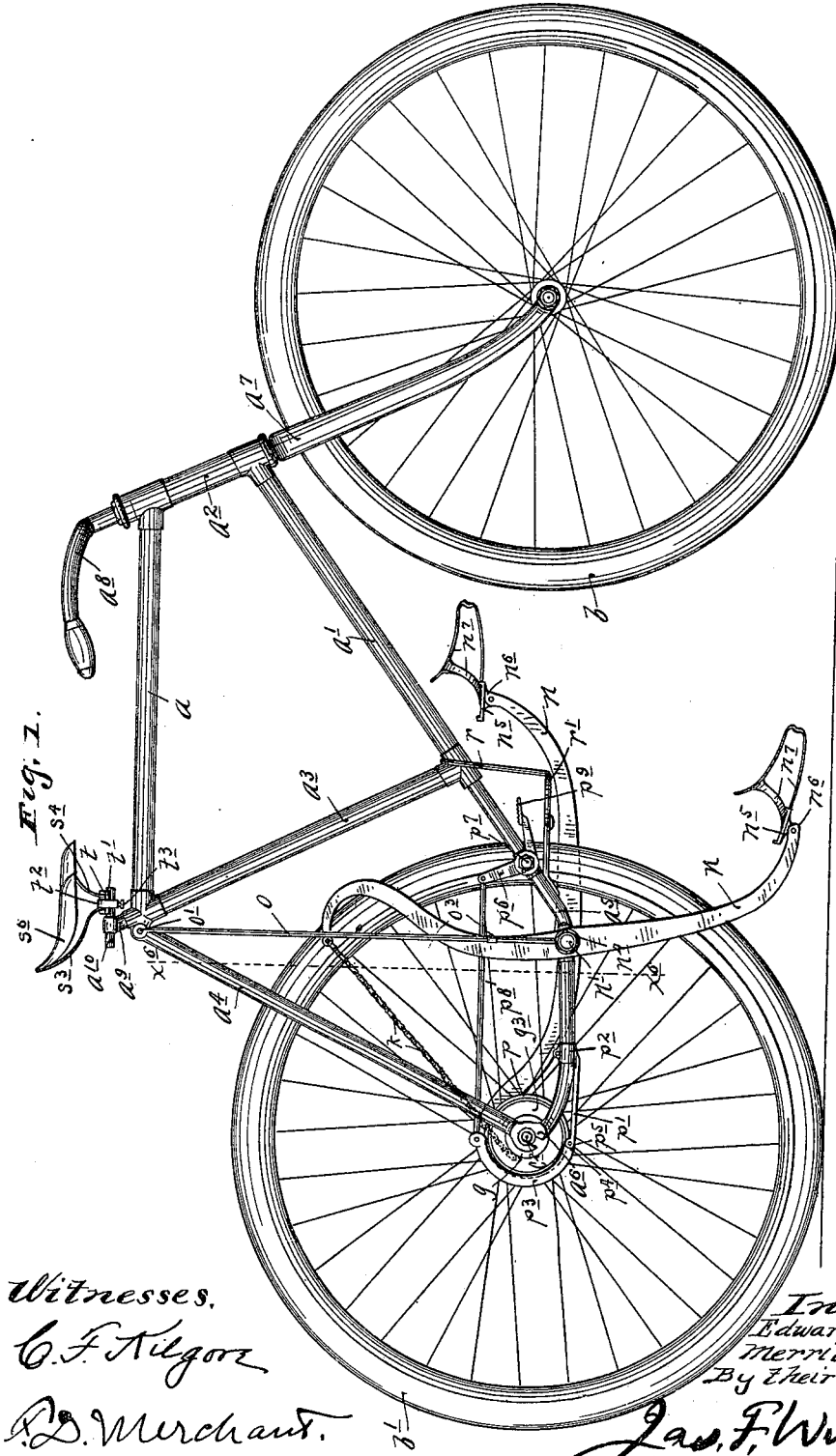

No. 644,686. Patented Mar. 6, 1900.
E. M. RUNYAN & M. G. POND.
BICYCLE.
(Application filed Oct. 4, 1897.)
(No Model.) 4 Sheets—Sheet 2.
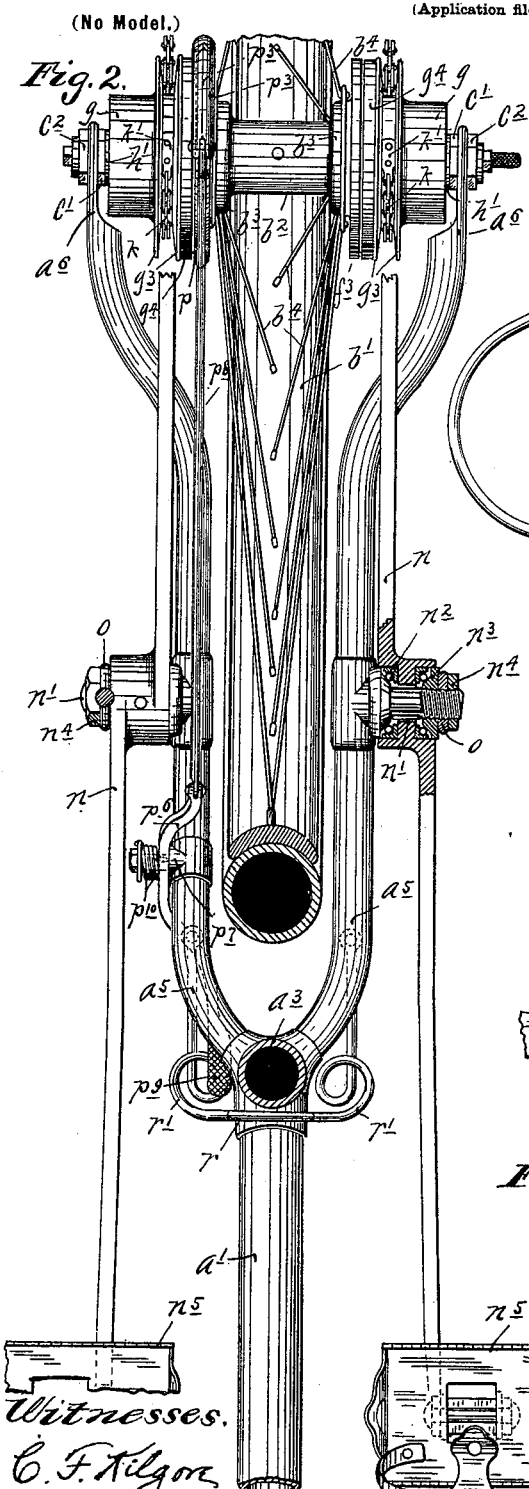
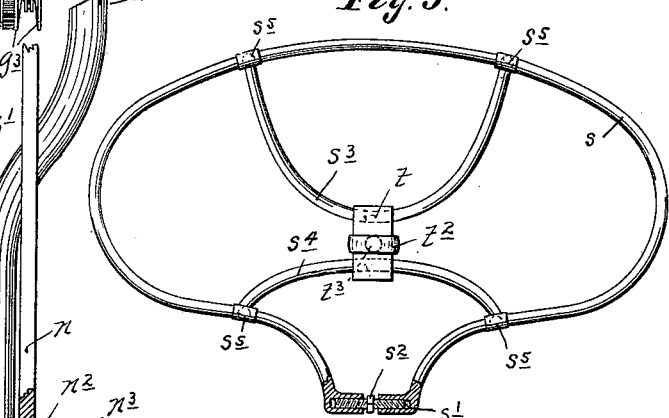
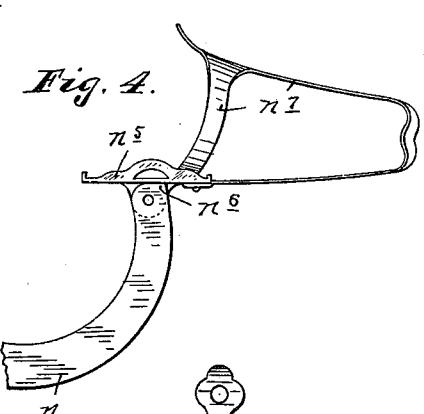
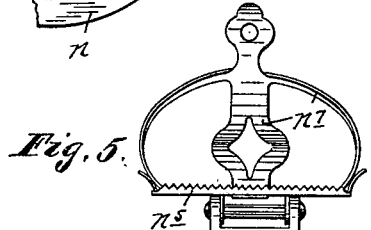
Witnesses.
C. F. Kilgore
L. D. Merchant
Inventors
Edward M. Runyan
Merritt G. Pond
By their Attorney
Jas. F. Williamson No. 644,686. Patented Mar. 6, 1900.
E. M. RUNYAN & M. G. POND.
BICYCLE.
(Application filed Oct. 4, 1897.)

(No Model.) 4 Sheets—Sheet 3.

Witnesses.
C. F. Kilgore
R. D. Merchant

Inventors
Edward M. Runyan
Merritt G. Pond
By their Attorney
Jas. F. Williams

No. 644,686. Patented Mar. 6, 1900.
E. M. RUNYAN & M. G. POND.
BICYCLE.
(Application filed Oct. 4, 1897.)
(No Model.) 4 Sheets—Sheet 4.
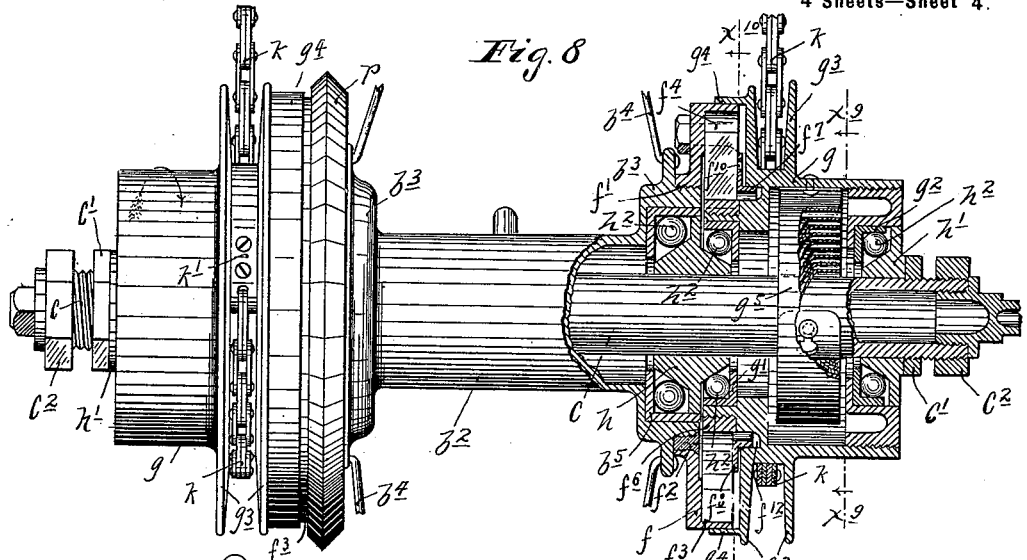
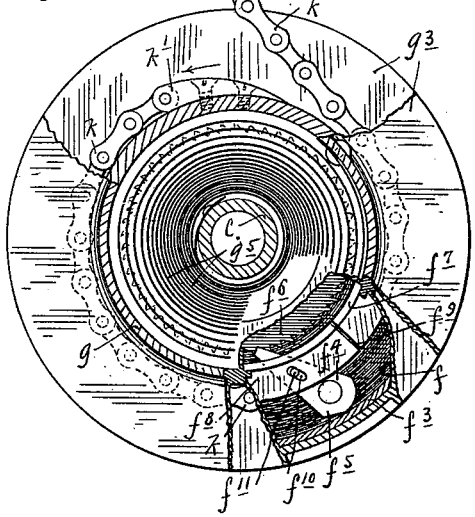
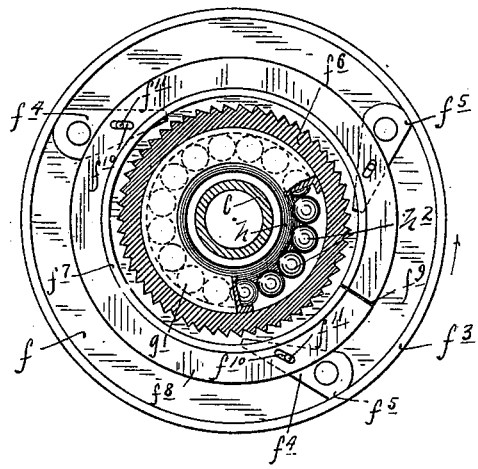
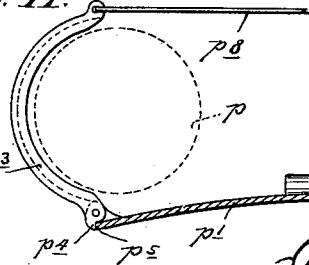
Witnesses.
C. F. Kilgore
R. D. Merchant
Inventors.
Edward M. Runyan
Merritt G. Pond
By their Attorney,
Jas. F. Williams
THE NORRIS PETERS CO., PHOTO-LITHO., WASHINGTON, D. C.

UNITED STATES PATENT OFFICE.

EDWARD M. RUNYAN AND MERRITT G. POND, OF MINNEAPOLIS, MINNESOTA, ASSIGNORS, BY DIRECT AND MESNE ASSIGNMENTS, TO THE AMERICAN TIMBER BROKERS, OF SUPERIOR, WISCONSIN, AND DULUTH, MINNESOTA.

BICYCLE.

SPECIFICATION forming part of Letters Patent No. 644,686, dated March 6, 1900.

Application filed October 4, 1897. Serial No. 653,934. (No model.)

*To all whom it may concern:*

Be it known that we, EDWARD M. RUNYAN and MERRITT G. POND, citizens of the United States, residing at Minneapolis, in the county of Hennepin and State of Minnesota, have invented certain new and useful Improvements in Bicycles; and we do hereby declare the following to be a full, clear, and exact description of the invention, such as will enable others skilled in the art to which it appertains to make and use the same.

Our invention has for its object to generally improve the construction of bicycles of the so-called "safety" type, but is especially directed to the production of such a machine which is capable of very high speed and great power.

To the ends above noted and others hereinafter noted our invention consists of the novel devices and combinations of devices hereinafter described, and defined in the claims.

The preferred form of our invention is illustrated in the accompanying drawings, wherein like characters indicate like parts throughout the several views.

Figure 6:
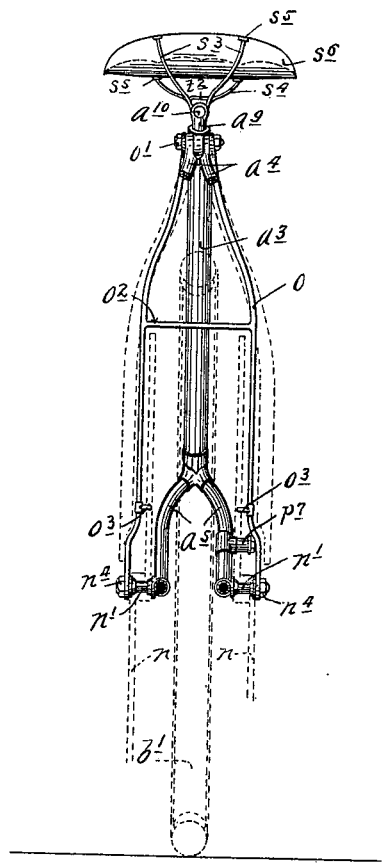
Figure 7:
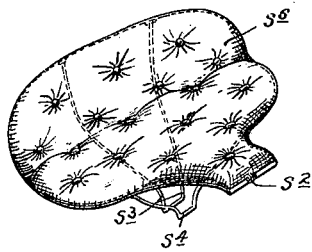

Figure 1 is a right side elevation of a bicycle constructed in accordance with our invention. Fig. 2 is an enlarged view of the central portion of the bicycle shown in Fig. 1, said parts being shown partly in plan and partly in horizontal section. Fig. 3 is a plan view of the skeleton seat-frame, some parts being shown in section. Fig. 4 is a detail view in right side elevation showing one of the pedals and the forward end of the connected pedal-lever. Fig. 5 is a rear elevation of the parts shown in Fig. 4. Fig. 6 is a skeleton view, partly in rear elevation and partly in vertical section, on the line $x^6 x^6$ of Fig. 1, some parts being shown in full and others by dotted lines. Fig. 7 is a perspective view of the seat removed from the machine. Fig. 8 is a view, partly in plan and partly in horizontal section, showing the detail construction of the hub, spindle, and driving-drums of the rear or traction wheel. Fig. 9 is a transverse section taken on the line $x^9 x^9$ of Fig. 8, certain parts being broken away, so as to show other parts which lie beyond. Fig. 10 is a transverse section taken on the line $x^{10} x^{10}$ of Fig. 8, and Fig. 11 is a view in side elevation of a portion of the brake.

The rigid portion of the frame is approximately diamond shape and involves the top tube $a$, bottom tube $a'$, steering-head $a^2$, seat-post or socket-tube $a^3$, forked backstay $a^4$, and rear forked bottom stay $a^5$. The rear ends of the prongs of the stays $a^4$ and $a^5$ are secured together by rear forked ends or spindle-forks $a^6$.

The steering-fork $a^7$ is mounted in the steering-head $a^2$ in the ordinary manner and is provided with handle-bars $a^8$.

$a^9$ indicates the vertically-adjustable seat-post, which is mounted in the socket-tube $a^3$ in the ordinary manner. The seat, to be hereinafter described, is secured to the head $a^{10}$ of this post $a^9$.

$b$ indicates the front wheel, which is mounted in the prongs of the steering-fork in the ordinary manner, and $b'$ indicates the rear or traction wheel, which is mounted in the rear forked ends $a^6$ by means which will now be described in detail.

A hollow spindle $c$ is passed through the hub of the rear wheel $b'$ and through the rear forked ends $a^6$ and is rigidly secured to the latter by means of pairs of nuts $c'$ $c^2$, which work with screw-threaded engagement on the ends of said spindle and clamp said forks $a^6$. The spindle $c$ is thus held so that it cannot revolve; but it may be readily removed from working position by loosening the nuts $c'$ $c^2$.

The rear or traction wheel $b'$ is provided with a barrel-like hub $b^2$, which is expanded at its ends, as shown at $b^3$, to form flanges, to which the spokes $b^4$ may be attached, and to form seats in which hardened ball-runways $b^5$ may be secured. Pawl-carrying disk-like rings $f$ are secured on the extreme outer ends of the hub enlargements $b^3$, as shown, by means of screw-threads $f'$ and lock-screw $f^2$. Preferably each pawl ring or disk $f$ is provided with an outwardly-projecting cylindrical flange $f^3$. A series of pawls $f^4$ are pivoted to and carried by each ring or disk $f$. These pawls $f^4$ are provided with stop projections $f^5$, which engage with the coöperating flange $f^3$ and limit the outward movements of said pawls, as shown in Fig. 10.

A pair of drums or hubs $g$ are loosely and independently mounted on the spindle $c$, one just outward of each end of the hub $b^2$. These drums or hubs $g$ are provided in their inner and outer ends, respectively, with hardened ball-runways $g'$ and $g^2$.

$h$ indicates a pair of double-faced bearing-cones, which are loosely mounted on the spindle $c$ and stand one between each coöperating pair of ball-runways $b^5 g'$. A single-faced bearing-cone $h'$ is loosely mounted on each end of the spindle $c$ for coöperation one with each ball-runway $g^2$. Bearing-balls $h^2$ work between the ball-runways $b^5 g' g^2$ and their respective bearing-cones.

It will be noted by reference particularly to Fig. 8 that the inner nuts $c'$ on the ends of the spindle $c$ press against the outer faces of the cones $h'$. Inasmuch as the cones $h$ and $h'$ are loose on the spindle, it will happen that when the cones $h$, or either one of the same, are forced inward by the nuts $c'$ the slack will be first taken up between the ball-runways $g'$ and $g^2$ of the hub $g$ and their coöperating balls and cones, and then the said double-faced cone $h$ will be moved inward until the proper adjustment between its inner face and coöperating runway $b^5$ and bearing-balls $h^2$ is effected. In other words, the act of adjusting the outer cones $h'$ will cause the double-faced cones to automatically assume properly-adjusted positions. The said bearing-cones $h$ and $h'$ are free to revolve on the spindle $c$; but it is of course obvious that the friction of the balls thereon will not be sufficient to cause any such movement. However, the double-faced cones $h$ are much more easily adjusted axially of the spindle $c$ when loosely mounted, as above described, than they would be if held against rotary movement by means of key-and-feather engagements or similar devices. It is of course evident that when the nuts $c^2$ are tightened, so as to clamp the forked ends $a^6$ between the same and the nuts $c'$, the adjustment of the cones $h$ and $h'$ will be set or fixed.

The hubs or drums $g$ are provided on their inner extremities with ratchet-teeth, which, as shown, are formed on the periphery of a ratchet-ring $f^6$, which ring is secured to said hub by screw-threaded engagement. The ratchet-rings $f^6$ are positioned in transverse line with the pawls $f^4$ and are adapted to be engaged by the free ends of the same. The pawls $f^4$ are thrown into and out of engagement with the teeth of the ratchet-rings $f^6$ and are rendered silent in their action by means of split spring friction-rings. These friction-rings are angular in cross-section, or, in other words, involve a cylindrical flange portion $f^7$ and a vertical flange portion $f^8$. The friction-ring is of spring metal and is sectioned, as shown at $f^9$. Its vertical flange portion $f^8$ works against the coöperating pawls $f^4$ and is provided with cam-slots $f^{10}$, in which pins $f^{11}$ on said pawls $f^4$ work. The cylindrical flange $f^7$ of said friction-ring works with a light friction against the concave cylindrical surface of a ledge or shoulder $f^{12}$, which is formed on the inner extremity of the coöperating hub or drum $g$.

The drums or hubs $g$ are each formed with a sheave-section $g^3$, and these sheaves $g^3$ are provided with inwardly-projecting annular flanges $g^4$, which telescope over and run close to the corresponding annular flanges $f^3$ of the pawl-disks $f$. The rear end of one of a pair of flexible chain connections $k$ is rigidly secured to the bottom of each sheave $g^3$ by means of an anchor-block $k'$. A pair of flat spirally-wound springs $g^5$ is rigidly secured to the spindle $c$, one within each hub or drum $g$, and rigidly secured at their outer ends, one to each of said drums or hubs $g$. These springs $g^5$ are so wound and applied that they will turn the drums $g$ and sheaves $g^3$ in a direction to wind up the chains $k$ onto their respective sheaves $g^3$.

In our improved machine we employ oscillating or vibrating driving-levers of the first class. These driving-levers, which are indicated at $n$, are pivoted one to each prong of the rear bottom stay $a^5$ on outwardly-projecting bearing-studs $n'$. The inner ends of these bearing-studs $n'$ are rigidly secured to the prongs of said backstay $a^5$, and their outer ends are suspended or braced by means of tension-rods $o$, secured thereto at their lower ends and secured at their upper ends to the top of the frame by means of a bolt $o'$. As shown, the tension-rods $o$ are tied together at their intermediate portions by a transverse rod $o^2$. Preferably the driving-levers $n$ are mounted on the bearing-studs $n'$ by means of ball-and-cone bearings, (indicated at $n^2$ $n^3$.) Nuts $n^4$ on the ends of the studs $n'$ serve to clamp the lower ends of the tension-rods $o$ against the adjustable bearing-cones $n^3$. The forward or free ends of the chains $k$ are attached to the rear ends of the driving-levers $n$.

Pedals $n^5$ are pivoted one to the free end of each driving-lever $n$. The forward ends of the levers $n$ are provided with stop projections $n^6$, which strike against the forward halves of the pedals $n^5$ and limit the downward pivotal movement of the forward sides of said pedals, as indicated in the raised pedal shown in Fig. 1. The said pedals are, however, free for a considerable pivotal movement in the reverse direction, so as to permit the foot and pedal to retain a substantially horizontal position when thrown into its lowermost position. (Also indicated in Fig. 1. The pedals $n^5$ are provided with toe-clips $n^7$, which are in the form of skeleton-like slippers. These toe-clips serve the ordinary function of preventing the rider from losing his pedals on the upward movement and also serve to keep the pedals in a horizontal position when the foot is removed and the driving-lever held upward. Inwardly-projecting studs or stops $o^3$ on the tension-rods $o$ limit the downward movements of the driving-levers $n$.

The brake device involves as one of its elements a friction-wheel $p$, which is rigidly secured to or formed integral with one of the pawl-carrying disks or rings $f$. Preferably this friction-wheel $p$ is formed with a face which is beveled in two directions, and, as shown, said wheel is secured to the right-hand end of the rear-wheel hub $b^2$.

$p'$ indicates a spring-acting supporting-arm which is provided at its forward end with a split clamp $p^2$, by means of which it is secured to the right-hand prong of the forked stay $a^5$, with its free end positioned directly under the friction-wheel $p$. To the free end of the supporting-arm $p'$ is pivoted the lower end of a segmental brake-shoe $p^3$, which is provided with a grooved face or working surface which fits the beveled face of the friction-wheel $p$. The lower end of said shoe $p^3$ is provided with a stop-lug $p^4$, which engages a stop-surface $p^5$ on the free end of said arm $p'$ to limit the rearward or releasing movement of said brake-shoe.

$p^6$ indicates a bell-crank pivoted on a stud $p^7$, projecting from the right prong of the forked stay $a^5$. The upper arm of the bell-crank $p^6$ is connected to the free end of the brake-shoe $p^3$ by means of a light rod $p^8$. The free end of the other arm of the bell-crank $p^6$ is provided with a foot or heel piece $p^9$. This foot or heel piece $p^9$ stands in such position that the rider may readily engage the same with his heel by throwing his heel inward without removing his right foot from the pedal while the same is raised. A spring $p^{10}$, coiled on the stud $p^7$, with one end secured thereto and the other end applied to the bell-crank $p^6$, normally holds the heel-piece $p^9$ upward to its limit and the brake-shoe $p^3$ in its released position. The spring supporting-arm $p'$ normally holds the lower end of the shoe $p^3$ below and away from the friction-wheel $p$, as shown in Fig. 11. When, however, the upper free end of the shoe is drawn forward against the friction-wheel $p$, the arm $p'$ will spring and permit the entire bearing-surface of the shoe to engage said friction-wheel.

We also provide foot or heel rests which are located transversely in line with the brake-actuating heel-piece $p^9$, or in position to be readily engaged by the rider's heels when his heels are thrown inward, but without moving his feet rearward out of the toe-clips or off from the pedals while the same are properly raised. These heel-rests are formed by a single piece of wire, which is bent at its center to form a suspending-yoke $r$ and on each side of this yoke $r$ is coiled in a horizontal plane to form steps or heel-rests $r'$. The ends of the wire which form the rests $r'$ are secured, by means of rivets or otherwise, one to each prong of the stay $a^5$. Normally the heel-piece $p^9$ stands high enough above the right member of the heel-rests $r'$, so that it may be engaged by the rider's heels and force downward to its limit in the brake-setting action. In this brake-setting action the rider may keep both feet on the pedals and may use his left foot on the left pedal and keep up the motion of the machine while applying the brake more or less, as may be desired. When coasting without removing the feet from the pedals, both the heels may be placed on the heel-rests $r'$, or the left heel may be placed on the left rest $r'$ and the right heel on the heel-piece $p^9$, and thus keep the machine under ready control.

In the improved seat which we preferably employ we provide a marginal wire $s$, which is bent to give the seat its outline. The ends of this marginal wire $s$ form the pommel of the saddle and are provided with screw-threaded seats $s'$, which extend in axial line with each other. A small jack-screw $s^2$, with right and left threads, works in the seats $s'$ and adjustably connects the ends of the wire $s$. A pair of U-shaped wires $s^3$ and $s^4$ are pivotally connected at their ends to the marginal wire $s$ by means of sleeves $s^5$, formed on the ends of said U-shaped supports $s^3$ $s^4$ and loosely fitting said wire $s$. The lower and central portions of the U-shaped supports $s^3$ $s^4$ are clamped and held by and between a pair of blocks $t$ $t'$, and these blocks $t$ $t'$ are in turn adapted to be clamped and held onto the head $a^{10}$ of the seat-post $a^9$ by means of a yoke $t^2$ and set-screw $t^3$.

By adjusting the jack-screw $s^2$ the seat-frame may be widened or narrowed to tighten the cover. As the U-shaped supports $s^3$ $s^4$ are pivoted to the marginal wire or frame $s$, the seat may be given any desired inclination or pitch when the clamp $t^2$ $t^3$ is loosened. When said clamp $t^2$ $t^3$ is tightened, the seat-frame will be held rigid wherever set. The seat-frame may be provided with any suitable covering, but is preferably provided with a strong upholstered pad or cover $s^6$.

The operation of the clutches or pawl-and-ratchet mechanisms under the pedaling action is as follows: When one of the pedals is forced downward at its free end, the chain or flexible connection $k$, which is connected to the other end of the same, would be unwound from the sheave $g^3$ of the drum or hub $g$, which is on that side of the machine, and the said drum or hub $g$ will thus be caused to rotate on the spindle $c$ against the strain of the spring $g^5$. The initial forward movement of the drum or hub $g$ in the direction indicated by arrows marked on Figs. 9 and 10 will carry the friction-ring $f^7$ $f^8$ in the same direction, and the cam-slots $f^{10}$, acting on the pins $f^{11}$, will throw the free ends of the pawls into engagement with the teeth of the ratchet-ring $f^6$. As the ratchet-ring $f^6$ is positively driven or carried by the hub or drum $g$ and as the pawls are carried by the hub $b^2$ of the rear or traction-wheel $b'$, said wheel $b'$ will thus be given its propelling motion. Under the upstroke of the foot and pedal the spring $g^3$ will wind up the chain $k$ onto its sheave $g^3$ and will give the drum $g$ a rotary movement in a reverse direction from the movement of the wheel $b'$ and parts carried thereby. This reverse movement of the drum $g$ or, in fact, any movement thereof in the same direction with said wheel, but at a slower speed, will pull back on the friction-ring $f^7 f^8$ and carry the free ends of the pawls $f^4$ out of engagement with the teeth of the ratchet-ring $f^6$, thus rendering the said pawl-and-ratchet device silent in its action. The friction-ring $f^7 f^8$ engages the annular ledge $f^{12}$ of the hub $g$ with a very light friction, and hence after it has shifted the pawls from one position to the other it will readily slip over the annular ledge $f^{12}$, which it frictionally engages. Under the pedaling action a great part of the downward strain on the pivot-studs $n'$ will be taken by the tension-rods $o$. As the driving-levers are pivoted approximately at their centers and in the vicinity of their centers of gravity, their ends are nearly counterbalanced, and hence the springs $g^5$ may be of quite light tension. It is of course important to have the springs $g^5$ of as light tension as possible, inasmuch as these springs resist the downward movement of the pedals. The use of the toe-clips or skeleton slippers applied to the pedals also relieves the springs $g^5$ of a good deal of their work, especially when running fast, as they prevent the rider from losing his pedals under quick upstrokes.

It is important to note that the rear ends of the levers $n$ are curved, so that they will fit over the winding-drums and extend to points diametrically opposite to points forward which are intersected by lines drawn through the centers of the drums and the centers of the coöperating lever-pivots. This permits the flexible connections $k$ to be wound entirely onto the drum.

What we claim, and desire to secure by Letters Patent of the United States, is as follows:

1. In a cycle, a clutch device involved in the propelling mechanism and comprising, pawls carried by one of the clutch-sections, a ratchet-wheel carried by the other member of said clutch-sections, and a spring friction-ring split at one point only and connected to said pawls or operating thereon, and frictionally engaging the clutch-section which carries said ratchet-wheel, or a part movable therewith whereby the use of independent springs is obviated, substantially as described.

2. In a cycle, a clutch device involved in the propelling mechanism and comprising pawls carried by the traction-wheel, a loose drum or hub provided with the cylindrical ledge $f^{12}$, and the split friction-ring $f^7 f^8$, the cylindrical flange of which frictionally engages said ledge $f^{12}$ and the vertical flange $f^8$ of which is connected to said pawls by means of cam-slot and pin connections $f^{10} f^{11}$, substantially as described.

3. In a bicycle, the combination with the traction-wheel, of the pawls $f^4$ pivoted on said flanges $f$ and provided with the stop-surfaces $f^5$ for engagement with said rims $f^3$, the loose hubs or drums $g$ provided with the ratchet-teeth $f^6$ and cylindrical ledge $f^{12}$, and the split friction-ring $f^7 f^8$, the cylindrical flanged portion $f^7$ of which frictionally engages said ledge $f^{12}$ and the vertical flanged portion of which is connected to the coöperating pawls $f^4$ by means of the cam-slot and pin engagements $f^{10}$ and $f^{11}$, substantially as described.

4. In a cycle, the combination with the fixed spindle $c$, of the wheel-hub $b^2$ provided with ball-runways $b^5$, the hubs or drums $g$ provided with the ball-runways $g'$ and $g^2$, the double-faced cone $h$ mounted on said spindle $c$ with freedom from both sliding and rotary movements, the single-faced cone-bearing $h'$ mounted for sliding movement on said spindle $c$, and the bearing-balls $h^2$ working between the said ball-runways and the coöperating cones, substantially as described.

5. In a bicycle, the combination with the vibrating foot-operated driving-levers and the traction-wheel, of a foot-operated brake involving the friction-wheel $p$ on the hub of the traction-wheel, the segmental brake-shoe $p^3$ provided with the stop-lug $p^4$, the spring-arm $p'$ secured to the machine and provided with the stop-surface $p^5$, the bell-crank lever $p^6$ provided with the foot or heel piece $p^9$ and subject to the action of the retracting-spring $p^{10}$, and the rod $p^8$ connecting the free ends of said brake-shoe $p^3$ and bell-crank $p^6$, substantially as described.

6. In a machine of the character described, the combination with vibrating driving-levers provided with pedals at their forward ends, of a pair of foot or heel rests supported from the machine-frame in position to be readily engaged or stepped upon when the heels are turned inward with the feet on the pedals, and a brake device involving an operating-lever provided with a heel-piece normally standing over and slightly above one of said foot or heel rests, whereby the rider may operate the brake while standing on said rests and pedals, substantially as described.

7. In a bicycle of the character described, the combination with vibrating driving-levers provided with pedals at their forward ends, of heel or foot rests located in position to be readily engaged or stepped upon when the heels are turned inward and the feet are on the pedals, substantially as described.

In testimony whereof we affix our signatures in presence of two witnesses.

EDWARD M. RUNYAN.
MERRITT G. POND.

Witnesses:
HARRY KILGORE,
F. D. MERCHANT.